D. R. YARNALL.
SIGHT WINDOW FOR WEIR GAGES.
APPLICATION FILED JAN. 12, 1914.
1,260,503.
Patented Mar. 26, 1918.
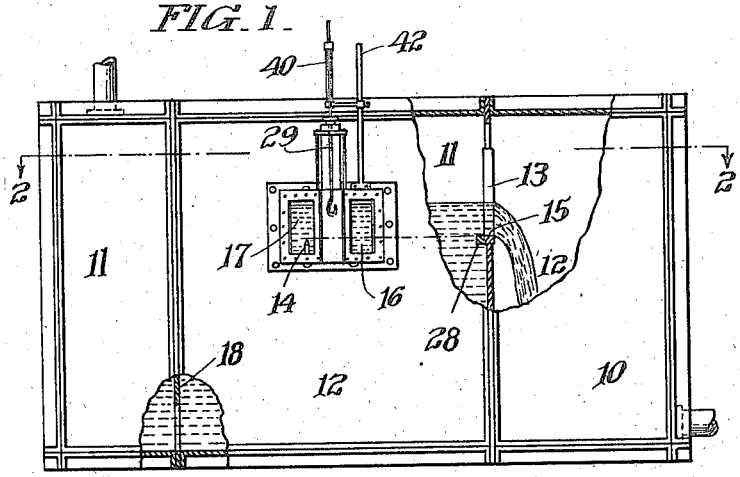
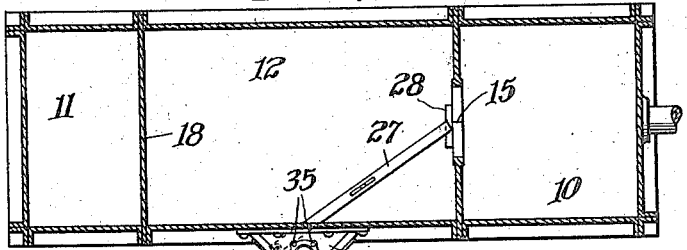
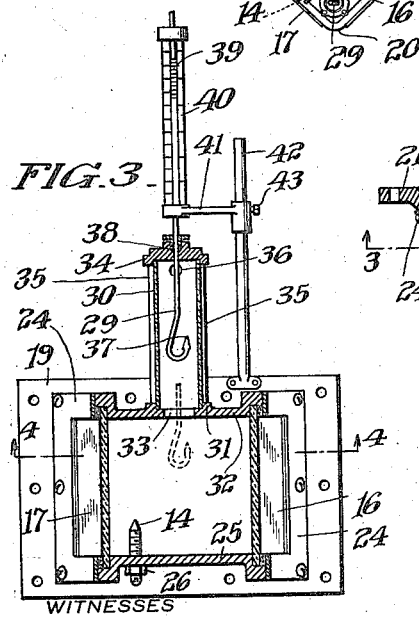
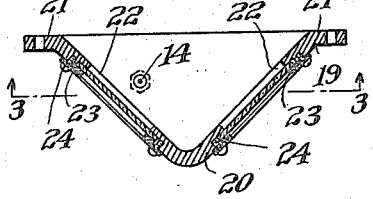
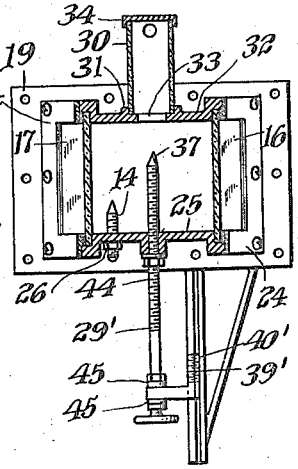
WITNESSES
INVENTOR
David Robert Yarnall
BY
Wm Steell Jackson
ATTORNEY

UNITED STATES PATENT OFFICE.

DAVID ROBERT YARNALL, OF PHILADELPHIA, PENNSYLVANIA.

SIGHT-WINDOW FOR WEIR-GAGES.

1,260,503.　　　　　Specification of Letters Patent.　　Patented Mar. 26, 1918.

Application filed January 12, 1914. Serial No. 811,581.

*To all whom it may concern:*

Be it known that I, DAVID ROBERT YARNALL, a citizen of the United States, residing at 316 Preston St., Philadelphia, in the county of Philadelphia and State of Pennsylvania, have invented a certain new and useful Sight-Window for Weir-Gages, of which the following is a specification.

The purpose of my invention is to provide a laterally projecting window or observation compartment within which the weir bottom gage and the hook gage are located and in which the former can be set from the weir by means of a spirit level.

Further purposes of my invention are shown in the claims and specification herewith.

I have preferred to illustrate my invention by forms thereof which are simple, effective and inexpensive and which at the same time well illustrate the principles thereof.

Figure 1 is a side elevation, partly broken, of a weir meter equipped with the preferred form of my invention.

Fig. 2 is a section upon line 2—2 of the construction shown in Fig. 1.

Fig. 3 is an enlarged section of a portion of the construction shown in Fig. 1, taken upon line 3—3 of Fig. 4.

Fig. 4 is a section taken upon the line 4—4 of Fig. 3.

Fig. 5 is a section corresponding with that in Fig. 3, but showing a modification.

The tank 10 may be of any suitable construction, here sectional, to provide a receiving chamber 11, catch basin chamber 12 and weir 13.

In order that the weir bottom or "zero" gage, as well as a hook gage or its equivalent for the exact determination of the height of water passing over the weir, shall be easily seen and the agreement of the point of the gage with the surface of the water thus conveniently and exactly learned, I place them in a "bay" window of which one form appears in the illustration and provide the window with glass sides 16, 17 through which observation may be had. I thus secure a clear view of the gages at close range in a compartment which is open along its inner side for a purpose indicated later.

In the form illustrated, I have placed the window within a side of the receiving chamber of the weir far enough away from the weir opening to avoid fluctuation or variation because of the weir and at a point where the surface is protected also by the partition plate 18 from fluctuation due to inlet water passing into the meter.

The particular form of observation window preferred by me comprises a casing 19, bowed at 20, having flanges 21, appropriate to the shape of the tank at the point where the window is to be attached, and openings 22 gasketed at 23. The panes are held in by strips 24 and any appropriate fastenings.

I prefer to set the "zero" gage 14 within the bottom 25 of the projecting portion of the window, making it accessible for adjustment from the outside of the window and having it locked in the set position by the lock nut 26. Its position and the open interior side of the window enable me to set this gage initially by any spirit level 27. This is rested at opposite ends upon the point of the gage 14 and a zero strip 28 whose height corresponds with the bottom of the weir notch. The gage 14 may thus be adjusted very nicely to the height of the weir bottom before the water is run into the weir. Fine adjustment may be made thereafter, as required.

The desirable initial setting of the gage 14 can be secured with a relatively short window height and it is not necessary that the window extend to the full height of the desired range for hook gage movement.

In order to show this fact, that the window need not be extended the entire height, I have selected for my illustrations forms in which the upper part is differently constructed. Thus I provide for the view of the upper part of the range of movement of hook gage 29 by a tube 30, secured suitably within groove 31 in the roof or top cover surface 32 of the window. I place this tube 30 in line with aperture 33 within the cover, so that the hook gage may be free to pass through the aperture down into the space within the window. The upper end of the tube is closed by a cap 34, which may be held in position by any suitable means, as by rods 35. The upper portion of the tube is in communication with the interior of the tank through cross tube 36, insuring that the level of the water in the tube shall be the same as that of the water in the receiving compartment of the meter.

The roof or top of the window interrupts the direct transverse view of the hook gage point 37 slightly when the gage point lies within the aperture, but this does not interfere with accurate determination of the height of the surface of the water because of the opportunity for observation of the point and water surface both from above and below and the good light thrown upon them through the tube and window panes.

The hook gage rod is gasketed at 38, where it passes through the cap 34 and carries a scale 39 which is movable over a vernier scale 40 by which exact readings of the height of the gage point 37 are made.

The scales are set so that the zero reading occurs when the hook gage point is at the height of the bottom of the weir, i. e., with the point of gage 14. The vernier scale is movable with respect to any suitable bracket 41, which slides upon rod 42 and is retained in adjusted position thereon by set screw 43.

The construction shown in Fig. 5 corresponds generally with that in Fig. 3, but instead of the more general form of hook gage I utilize a rod form, included by me here under the general name hook gage and comprising a rod 29' having a point 37 corresponding to the point of the hook gage but insertible from the bottom instead of the top, and most conveniently screw-threaded at 44 for adjustment. It carries a scale 39' movable over the vernier scale 40' for determination of the height of the point 37. The scale 39' is adjustable in any suitable manner, as by lock nuts 45, so that it is at zero on the vernier scale when the point 37 is at the level of the bottom of the weir notch.

In a closed weir tank I thus provide an accessible adjustment for a visible zero gage for the weir so located as to be easily and quickly leveled with the bottom of the weir.

I also accommodate my structure to the use of a hook gage whether of the normal type or of a type insertible and adjustable from below and wholly lying below the point thereof.

Having thus described my invention, what I claim as new and desire to secure by Letters Patent is:

1. In a weir meter, a casing, a weir partition therein, a zero strip adjacent the weir having a height equal to that of the bottom of the weir, a zero gage, a sight compartment within which the zero gage is located and open upon the face toward the weir and adapted to permit free passage of a spirit level between the zero gage and the zero strip.

2. In a weir meter, a casing, a weir partition therein, a transparent bay window open from the casing, a zero gage in the bay window, means for adjusting the zero gage, extending beneath the window and a hook gage entering the bay window and adjustable from outside the window.

3. In a weir meter, a casing, a weir partition therein, a transparent bay window open from the casing at the weir bottom level, a tube in the top of the bay window, a connection between the tube and casing, a hook gage entering the window and tube, an adjustment for the hook gage, accessible from outside of the window and a zero gage in the window.

DAVID ROBERT YARNALL.

Witnesses:
BERNARD E. WARING,
E. K. SHELLY.

Copies of this patent may be obtained for five cents each, by addressing the "Commissioner of Patents, Washington, D. C."